United States Patent [19]

Weigand

[11] 4,110,929

[45] Sep. 5, 1978

[54] FISHING ROD AND PROJECTILE FIRING GUN

[76] Inventor: Dwayne R. Weigand, 8504 S. Miller, Oklahoma City, Okla. 73159

[21] Appl. No.: 858,147

[22] Filed: Dec. 7, 1977

[51] Int. Cl.² ............... A01K 91/02; F41F 1/04
[52] U.S. Cl. ............................ 43/19; 124/57; 124/71
[58] Field of Search ............ 124/57, 71, 74, 76; 43/6, 19

[56] References Cited

U.S. PATENT DOCUMENTS

| | | | |
|---|---|---|---|
| 2,723,656 | 11/1955 | Andina | 124/57 |
| 2,839,862 | 6/1958 | Hanshaw | 43/6 |
| 2,885,815 | 5/1959 | Clagg | 43/19 |
| 2,957,468 | 10/1960 | Enfield | 124/57 |
| 2,977,706 | 4/1961 | Merz | 43/19 |
| 3,045,659 | 7/1962 | Malcolm | 124/57 |
| 3,056,395 | 10/1962 | Merz et al. | 124/57 |
| 3,227,148 | 1/1966 | Spack | 124/76 |
| 3,364,609 | 1/1968 | Kennedy | 43/6 |
| 3,656,252 | 4/1972 | Sherman | 43/19 |

FOREIGN PATENT DOCUMENTS

| | | | |
|---|---|---|---|
| 266,543 | 10/1964 | Australia | 124/57 |
| 656,682 | 10/1963 | Italy | 43/6 |

Primary Examiner—Richard T. Stouffer
Attorney, Agent, or Firm—Robert K. Rhea

[57] ABSTRACT

A fishing rod, having a longitudinal bore for the reception of an elongated projectile, replaces the conventional barrel and is secured to the magazine of a compressed gas fired pistol. The bore includes a lateral port communicating with a charge of gas under pressure. The elongated projectile is closed at its forward end and includes an axial socket open at its other end. A tubular bolt is slidably received in the bore of the fishing rod and the axial socket of the projectile. The bolt is closed at its rearward end but includes a lateral port communicating with the lateral port in the bore and with the axial socket of the projectile, whereby the bolt transfers the charge of gas to the projectile for firing thereof. A monofilament line, wound on a spin-cast reel supported by the fishing rod, has its free end attached to the projectile for retrieving the projectile after being fired at a target.

6 Claims, 9 Drawing Figures

FISHING ROD AND PROJECTILE FIRING GUN

BACKGROUND OF THE INVENTION

1. Field of the Invention

The present invention relates to angling and more particularly to the sport of spear fishing nongame fish commonly known as "rough fish."

2. Description of the Prior Art

It is presently popular to spear nongame fish either by a hand held spear or by a bow and arrow, which may be a crossbow, with a fishing line tied to the arrow and the bulk of the line wrapped on a bow mounted reel. The line and arrow are retrieved by hand or by winding the line on the reel.

U.S. Pat. No. 3,656,252 discloses a fishing pole bait or lure casting mechanism which includes a fishing rod and a fishing reel for retrieving the line and a fish.

This invention is an improvement over the bow and arrow type of spear fishing and the above named patent by providing a fishing rod having a bore therethrough acting as a projectile receiving and firing gun barrel which is mounted on a compressed gas charge fired pistol in place of the conventional barrel. The rod is further provided with a spin-cast reel having a line thereon and attached to the projectile fired by the gun through the bore of the fishing rod. Since the line passes through the bore of the fishing rod, the fishing rod is, by its flexing tip end action, advantageous in retrieving the line and fish.

SUMMARY OF THE INVENTION

A jointed fishing rod comprising a rigid portion and a flexible tip end portion, each having a longitudinal bore forming a rod-barrel portion and a tubular rod portion, is mounted on the magazine of a conventional compressed gas charge fired pistol in place of the conventional pistol barrel. The rigid end portion of the rod is provided with a lateral opening communicating with its bore for receiving an elongated projectile to be fired through the bore. The bore of the rigid end portion slidably receives a tubular bolt having a closed breech end and a forward open end slidably received by a breech end open axial socket in the projectile. An inlet port, formed in the bolt, communicates with the compressed gas charge passageway of the pistol and transfers the charge of gas against the closed forward end of the projectile for launching or firing it in response to the gas charge being released by the trigger of the gun. A spin-cast reel, mounted on the rigid portion of the rod-barrel, has a monofilament line wound thereon and attached to the trailing end of the projectile whereby the line and projectile may be retrieved and the fishing rod manipulated in a fish landing manner as the payed out line is rewound on the reel.

The principal object of this invention is to provide a lightweight compact device comprising a fishing rod secured to a small compressed gas type gun for firing a projectile through a bore formed in the fishing rod and retrieving a speared fish by a reel mounted on the fishing rod having its line connected with the projectile.

DESCRIPTION OF THE PREFERRED EMBODIMENT

Figure 1:
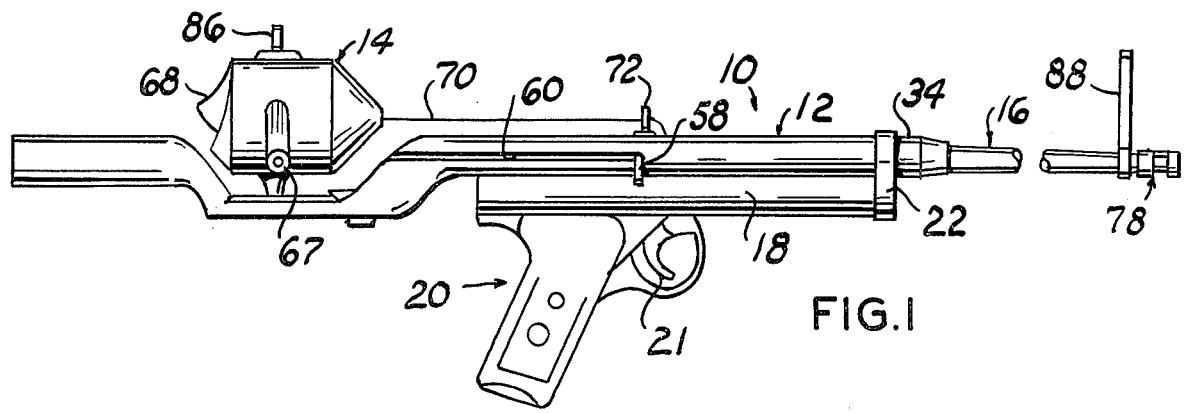
FIG. 1 is a fragmentary right side elevational view of the device mounted on the magazine of a conventional compressed gas charge firing pistol.
Figure 2:
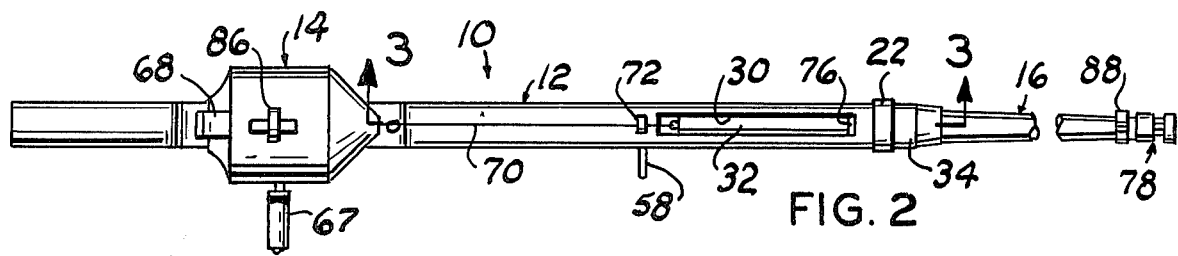
FIG. 2 is a top view of FIG. 1.
Figure 3:
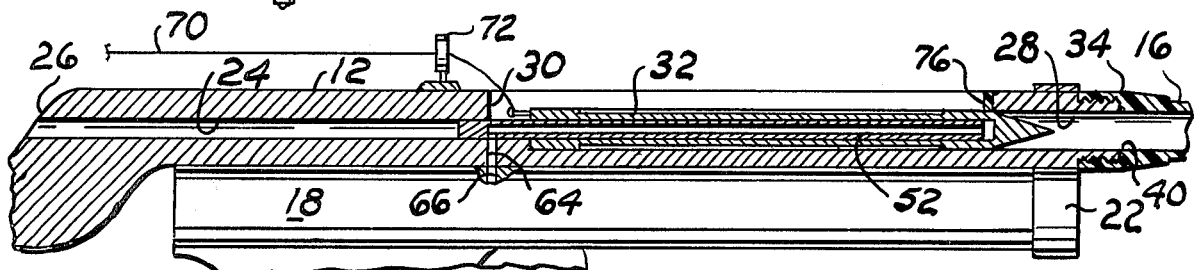
FIG. 3 is a fragmentary vertical cross sectional view, to an enlarged scale, partially in elevation, taken substantially along the line 3—3 of FIG. 2.
Figure 6:
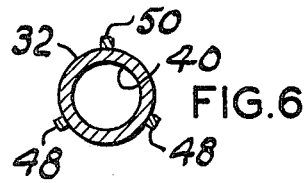
FIG. 6 is a transverse sectional view, to another scale, taken substantially along the line 6—6 of FIG. 5.
Figure 4:
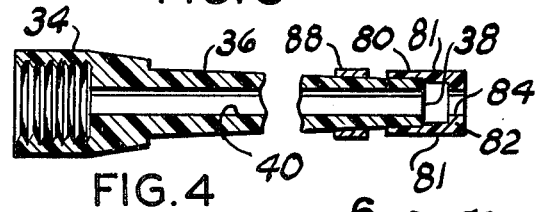
FIG. 4 is a fragmentary longitudinal sectional view, to a further enlarged scale, of the flexible end portion of the fishing rod.
Figure 5:
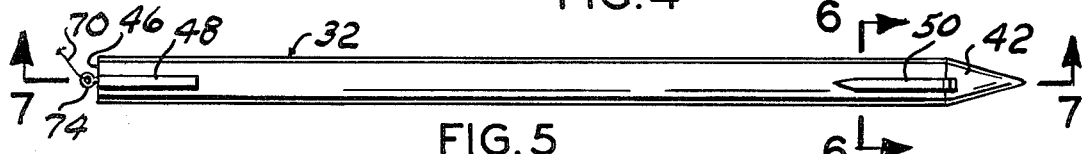
FIG. 5 is an elevational view, to another scale, of the projectile.

Like characters of reference designate like parts in those figures of the drawings in which they occur.

In the drawings:

The reference numeral 10 indicates the device, as a whole, comprising a jointed fishing rod comprising a rigid end portion 12 having a spin-cast reel 14 secured, in a conventional manner, to its rearward end portion and an elongated flexible tip end portion 16 coaxially connected to the forward end of the rigid portion 12. The fishing rod rigid portion 12 is mounted on the magazine 18 of a conventional pistol 20 in place of the conventional pistol barrel, not shown, by a band or clamp 22 surrounding the forward end portions of the rigid portion 12 and magazine. The rigid portion 12 is longitudinally bored, as at 24, from its breech end 26 and counterbored from its forward end, as at 28, a selected distance thus forming a fishing rod-barrel. The rod-barrel 12 is further provided with an upwardly open slot or opening 30 terminating forwardly adjacent the clamp 22 and terminating rearwardly equidistant with the counterbore 28 for receiving an elongated projectile 32. The width of the opening 30 is equal to the diameter of the counterbore 28 and its length is substantially equal to the length of the projectile 32.

The fishing rod extension or tip end portion 16 is preferably formed of material which may be flexed laterally and returning to its axially aligned relation with the rod-barrel bore 28, such as fiberglass and is further characterized by a nut portion 34 formed on or secured to its rearward end for threadably engaging the forward end portion of the rod-barrel 12 and is further characterized by its outer wall surface 36 converging toward its forward end 38.

The rod extension 16 is longitudinally bored, as at 40, diametrically equal with the counterbore 28 and forms a continuation thereof.

Figure 7:
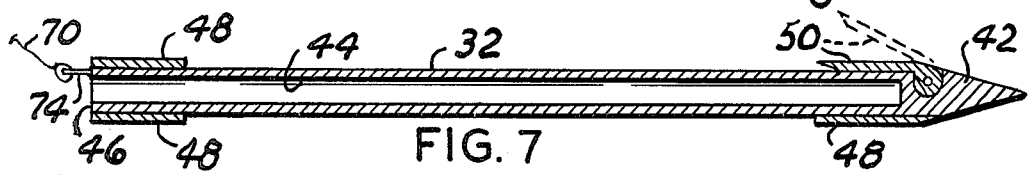
FIG. 7 is a longitudinal sectional view taken substantially along the line 7—7 of FIG. 5.
Figure 8:
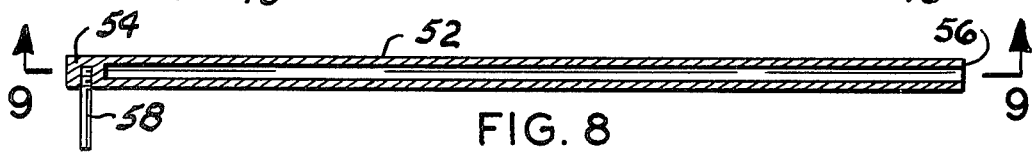
FIG. 8 is a longitudinal sectional view through the bolt.
Figure 9:
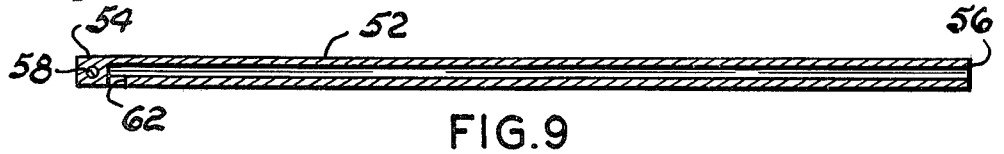
FIG. 9 is a longitudinal sectional view taken substantially along the line 9—9 of FIG. 8.

The projectile 32 is provided with a forward pointed head end 42 and a coaxial socket 44 open at its rearward end 46. Diametrically the projectile 32 is slightly smaller than the inside diameter of the rod-barrel bore 28 and the bore 44 of the tubular rod extension 16. The respective end portions of the projectile are provided with antifriction slides or guides 48 secured thereto in circumferentially equally spaced relation. One of the guides forms a barb 50, pivotally connected at its forward end to the projectile head 42, for pivoting movement of its other end portion toward and away from the periphery of the projectile, as shown by dotted lines (FIG. 7). The end of the barb 50, opposite its pivotal connection is sharpened for entering the flesh of a speared fish, not shown, to normally prevent removal of the projectile head.

A tubular bolt 52, having a rearward closed end 54, is slidably received longitudinally by the rod-barrel bore 24 and the projectile socket 44 with the open end 56 of the bolt being disposed adjacent the inward limit of the projectile socket 44 when the bolt is in position for firing the projectile. The bolt is manually moved into and out of firing position by a bolt handle forming a latch 58 secured to and projecting laterally of the rearward closed end 54 with the bolt handle being slidably received by a lateral slot 60 formed in the rod-barrel coextensive with the rod-barrel bore 24. The bolt handle 58 is locked in firing position in a manner conventional with gun magazine bolts. The bolt 52 is further provided with a lateral port 62 adjacent its closed end 54 which communicates with a lateral port 64 formed in the rod-barrel 12 in turn aligned with the magazine exhaust port 66 through which the compressed gas charge is ejected.

The spin-cast reel 14 is substantially conventional having a handle 67, manually operated by a line release button 68 and contains a wound-up monofilament line 70. The free end portion of the line 70 is entrained through a line guide 72 mounted on the rod-barrel 12 rearwardly of the opening 30 and is connected with a ring or loop 74 attached to the rearward end 46 of the projectile.

An antifriction line guide 76 is secured to the wall forming the forward limit of the rod opening 30 and the forward end 38 of the rod extension 16 is provided with an antifriction line guide 78. The line guide 78 comprises a collar-like member 80 surrounding the forward end portion of the rod extension 16 and connected, by a plurality of parallel circumferentially spaced forwardly projecting ribs 81, with a ring 82 having a bore 84 coaxial with and at least diametrically equal with respect to the bore 40 of the rod extension 16. In addition to forming an antifriction line guide the ring 82 forms a drip rail whereby water, collected off the fishing line 70 as it is reeled in, drains by gravity through the spaces defined by the ribs 81.

A rear sight 86 is mounted on the reel 14 and a front sight 88 is mounted on the forward end portion of the extension 16.

OPERATION

In operation, the line 70 is attached to the projectile 32, as described hereinabove, and the projectile is inserted into the rod-barrel opening 30 with its pointed end portion 42 disposed within the forward end portion of the rod-barrel bore 28. The bolt 52 is manually moved forwardly from the rod-barrel bore 24 into the socket 44 of the projectile and the bolt handle 58 locked in place. The projectile is maintained stationary during the bolt insertion action, as by the operator holding his thumb or forefinger on a peripheral portion of the projectile exposed through the opening 30. With the line release button manually pushed, the device 10 is held by the handle of the pistol 20 with the operator's forefinger on the trigger 21 and aimed at a fish to be speared. By pulling the trigger 21 the compressed gas charge contained by the pistol is released through the ports 64 and 66 into the bore of the tubular bolt wherein the gas charge propels the projectile 32 toward the target.

Thereafter, the device 10 is manipulated as a fishing rod to land the impaled fish, while progressively winding the line 70 on the reel to retrieve the projectile and fish.

Obviously the invention is susceptible to changes or alterations without defeating its practicability. Therefore, I do not wish to be confined to the preferred embodiment shown in the drawings and described herein.

I claim:

1. In a gas operated pistol having a hand grip secured to a magazine capable of containing a charge of gas under pressure for propelling a projectile and having a trigger means for releasing the gas charge, the improvement comprising:

a barrel having a longitudinal through bore and having a forward end and a breech end longitudinally mounted on said magazine, said barrel having a lateral port communicating with the gas charge and having a longitudinal opening in its forward end portion communicating with its bore;

an elongated projectile freely received by the barrel opening and longitudinally slidable within the barrel bore, said projectile having a pointed forward end and having an elongated axial socket open at its other end;

an elongated flexible strand secured to said other end of said projectile;

a tubular bolt having a closed rearward end slidably received longitudinally by the bore and the projectile socket, said bolt having a lateral port adjacent its closed end communicating with the lateral port of said barrel, said lateral port communicating by a passage through said bolt with said elongated axial socket of said projectile; and, latch means normally preventing rearward movement of said bolt.

2. The combination according to claim 1 and further including:

a reel containing a flexible strand mounted on the breech end of said barrel, said strand being connected with said rearward end of said projectile.

3. The combination according to claim 2 and further including: an elongated tubular rod coaxially secured to the forward end of said barrel, the bore of said rod being of uniform cross section throughout its length and forming a continuation of the barrel bore.

4. The combination according to claim 3 and further including:

radially disposed antifriction glides secured to the respective end portions of said projectile.

5. The combination according to claim 4 and further including:

a barb pivotally secured to the forward end portion of said projectile for lateral movement with respect to the longitudinal axis of said projectile.

6. The combination according to claim 5 and further including:

at least one flexible strand guide secured, respectively, to the forward end portion of said projectile and to said barrel intermediate its ends.

* * * * *